No. 646,738. Patented Apr. 3, 1900.
F. C. INGALLS.
FASTENER.
(Application filed Nov. 30, 1897.)
(No Model.)
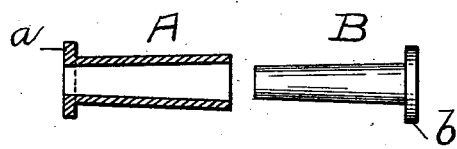
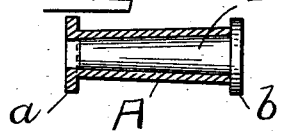
WITNESSES:
C. Elwood Bell
M. G. MacLean
INVENTOR.
Frederic C. Ingalls,
BY
ATTORNEYS

UNITED STATES PATENT OFFICE.

FREDERIC CYRUS INGALLS, OF UTICA, NEW YORK.

FASTENER.

SPECIFICATION forming part of Letters Patent No. 646,738, dated April 3, 1900.

Application filed November 30, 1897. Serial No. 660,189. (No model.)

*To all whom it may concern:*

Be it known that I, FREDERIC CYRUS INGALLS, a citizen of the United States, and a resident of Utica, county of Oneida, and State of New York, have invented certain new and useful Improvements in Fasteners, of which the following is a specification, reference being had to the accompanying drawings, forming a part thereof, in which similar letters of reference indicate corresponding parts.

This invention relates to improvements in fasteners; and the object thereof is to provide a simple, inexpensive, convenient, and operative device of this character which is adapted for connecting or fastening together by hand or with a hammer and without the aid of auxiliary machinery a plurality of sheets of paper or other substance requiring secure attachment with each other.

The invention will be hereinafter fully described, and specifically set forth in the annexed claim.

In the accompanying drawings, forming part of this specification, Figure 1 is a side elevation of the device, showing the two members comprising the same detached, the outer member being in longitudinal sectional elevation; and Fig. 2 is a similar view showing the two members in telescopic connection.

In the practice of my invention I provide two members or sections A and B, the cross-section of which may be either of circular or other adapted form, the member B being of a size adapted for telescopic connection within the tubular member A and for securing frictional contact therewith, whereby the two said members will not be disengaged from each other accidentally or loosened by effect of use after they have been assembled. The members A and B may both be tubular, or in the case of large-sized fasteners the section B may be made solid to add strength to the device. The outer section A of the fastener is provided at one end with an annular projection, flange, or head $a$, and the inner section B is provided with a similar projection $b$. Each of these said sections is of tapering contour, the size of the outer section A increasing from its annular projection and the size of the inner section B decreasing from its annular projection, whereby the two said sections are maintained in secure frictional engagement when they are assembled, as illustrated by Fig. 2 of the drawings.

In the operation and use of the device a hole is made through the several sheets or substances to be connected by means of a hand-punch, the hole being of a cross-section equal to and of the same shape as the outer section A of the fastener. This said section of the fastener is then passed through the hole formed in the sheets or substances to be connected, after which the inner section is driven tightly within the outer section, whereby they are held securely and permanently together and the sheets or substances connected are prevented from being laterally displaced by means of the annular flanges or the solid heads $a$ and $b$.

Having thus described my invention, what I claim as new, and desire to secure by Letters Patent, is—

A fastener, comprising one outer tube having an annular projection around its outer end, the cross-section of the inner walls of which tube is of circular or analogous form, slightly increasing from the annular projection toward the opposite end, and an inner tube also having an annular projection around its outer end, and having the cross-section of its outer walls of similar form to that of the inner walls of the outer tube, slightly diminishing from its flange or head toward the opposite end, and being adapted for telescoping into said outer tube and of being permanently maintained therein by frictional engagement, substantially as shown and described.

In testimony that I claim the foregoing as my invention I have signed my name, in presence of two witnesses, this 20th day of November, 1897.

FREDERIC CYRUS INGALLS.

Witnesses:
FREDERIC C. INGALLS, Jr.,
HENRY S. INGALLS.